United States Patent

Smith et al.

[11] Patent Number: 5,990,632
[45] Date of Patent: Nov. 23, 1999

[54] EXCITATION CIRCUIT FOR AN ELECTRODELESS LAMP INCLUDING A PULSED POWER SOURCE

[75] Inventors: Raymond A. Smith, Severna Park; Edward H. Hooper, Baltimore, both of Md.

[73] Assignee: Northrop Grumman Corporation, Los Angeles, Calif.

[21] Appl. No.: 08/969,272

[22] Filed: Nov. 13, 1997

[51] Int. Cl.$^6$ .................................................. H05B 41/16
[52] U.S. Cl. ......................... 315/248; 315/267; 315/344
[58] Field of Search .................................. 315/248, 344, 315/267, 219; 330/207 A, 251; 313/594, 601

[56] References Cited

U.S. PATENT DOCUMENTS

| | | | |
|---|---|---|---|
| 4,245,178 | 1/1981 | Justice | 315/248 |
| 5,027,041 | 6/1991 | Godyak et al. | 315/248 |
| 5,200,672 | 4/1993 | Sheynberg et al. | 315/248 |
| 5,519,285 | 5/1996 | Ukegawa et al. | 313/594 |

*Primary Examiner*—David H. Vu

[57] ABSTRACT

An RF source is periodically pulsed for exciting an electrodeless light bulb in an on-off mode so as to intermittently drive the bulb to a high peak power operating point where light generation efficiency is relatively high, while maintaining a relatively low average power input. Pulse rate and duration are optimized to minimize light flicker while maximizing light emission efficiency.

8 Claims, 2 Drawing Sheets

EXCITATION CIRCUIT FOR AN ELECTRODELESS LAMP INCLUDING A PULSED POWER SOURCE

BACKGROUND OF THE INVENTION

1. Field of the Invention

This invention relates generally to a method and apparatus for exciting a light source, and more particularly to a method and apparatus for exciting a high intensity electrodeless light bulb.

2. Description of Related Art

In the field of electrodeless lamp technology, improvements are constantly being made on apparatus for generating high intensity light in a plasma generated and sustained by RF excitation. The lamp itself is generally well known and typically comprises a closed, transparent quartz light bulb filled with an inert gas and certain chemical elements. Typically, the gas is comprised of argon and element(s) selected from Group VI-A of the periodic table of elements, e.g. sulfur. Where sulfur is used as the material in the bulb and is heated by concentration of RF energy coupled thereto from an RF driver circuit, the inert gas is ionized and the elements contained therein are vaporized to form a high temperature plasma which emits high intensity light which is similar to bright sun light. As is well known, RF coupling to the bulb is provided through a coupling coil or other means, external to the bulb, in order to create and sustain the plasma.

For low power bulbs, in the order of 100–200 watts, the exciting RF frequency is typically between 10 MHz and 100 MHz, with a selection of frequency being determined by the effectiveness of coupling and Federal Communications Commission (FCC) frequency allocation.

The effective RF to light power efficiency of such a low power electrodeless lamp is determined, in part, by initial power input level to the bulb which is necessary to generate and heat the plasma before any light is emitted. This offset results in a net bulb efficiency characteristic which improves as power input to the bulb is increased. Thus, a penalty in efficiency is paid for low power bulb operation.

SUMMARY

Accordingly, it is an object of the present invention to provide an improvement in high intensity light sources.

It is another object of the invention to provide an improvement in the efficiency of light generation in high intensity electrodeless light bulbs.

It is a further object of the invention to provide an improvement in the method of exciting a high intensity electrodeless light bulb.

It is yet a further object of the invention to provide an improvement in the apparatus for exciting a high intensity electrodeless light bulb.

The foregoing and other objects of the invention are achieved by a method and apparatus for pulsing an RF source which is used to excite an electrodeless light bulb. The principle of operation comprises pulsing the RF source in an on-off mode so as to drive the bulb to a high peak power operating point where light generation efficiency is relatively high, while maintaining a relatively low average power input. Pulse rate and duration are optimized to minimize light flicker while maximizing efficiency of light emission. A pulse rate in the range of 240 Hz or greater is therefore desirable. The RF source comprises a pulsed power oscillator including an RF power amplifier, a pulsed bias source for the power amplifier, an impedance matching circuit coupled between the RF source and an excitation for the bulb, and a feedback circuit incorporating elements of the power amplifier for generating an RF bulb excitation signal at a frequency determined by the loading effect of the light bulb.

Further scope of applicability of the present invention will become apparent from the description provided hereinafter. It should be understood, however, that the detailed description and specific examples set forth therein, while disclosing preferred embodiments of the invention, are provided by way of illustration only, since various changes and modifications coming within the spirit and scope of the invention will become apparent to those skilled in the art from this detailed description.

BRIEF DESCRIPTION OF THE DRAWINGS

The present invention will become more fully understood from the detailed description provided hereinafter and the accompanying drawings which are provided by way of illustration only, and thus are not meant to be limitative of the invention, and wherein.

DETAILED DESCRIPTION OF THE INVENTION

The present invention is directed to a mode of operation of an RF source for electrodeless lamps which results in higher emission efficiency while providing low average power. The mode of operation is on-off pulsing of the electrodeless light bulb to a peak input power level in a manner such that average light output is higher for a given average power input than would be the case for a constant power input of the same average level.

Figure 1:
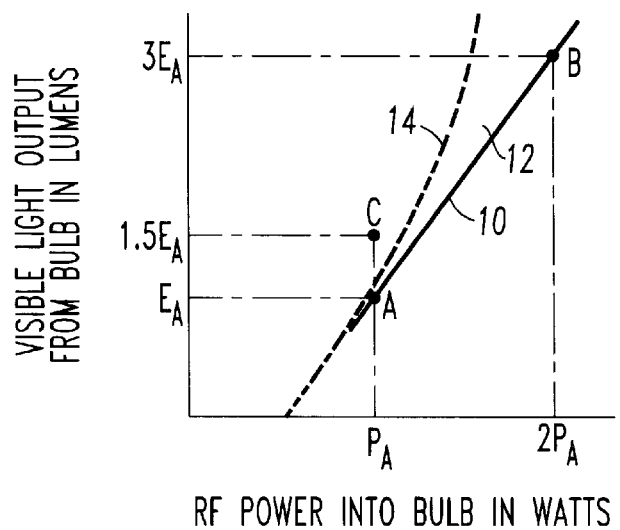
FIG. 1 is a graph depicting light output vs. power input to an electrodeless light bulb in accordance with the subject invention.

Referring now to the drawings and more particularly to FIG. 1, shown threat is a characteristic which is illustrative of the light output vs. RF power input to an electrodeless light bulb containing an inert gas and certain predetermined chemical elements. As shown, the straight line 10 depicts a linear characteristic which defines a steady state or continuous mode of operation for such a light bulb over a visible light producing range. The area 12 between the straight line 10 and the curved dashed line 14 represents the domain over which this characteristic may shift and become non-linear during a pulsed mode of operation. An extension or extrapolation of the straight line 10 has an input power axis intercept which is determined by initial, non-light producing heat input to the bulb. The steady state efficiency of the bulb at point A of FIG. 1, for example, which is near the low end of the light producing range, is low and is equal to $E_A/P_A$, where $E_A$ is the bulb's light power output and $P_A$ is the RF input power to the bulb. If the bulb is operated in a pulsed mode having, for example, a 50% duty cycle to point B with no excitation or drive between pulses, the peak RF input at point B is twice that of point A, i.e. $2 P_A$. At that point, the bulb's light power output is shown to be at least $3 E_A$. It may be greater than this because of the bulb's transient response.

Accordingly, the average light power out of the bulb is at least 3 $E_A/2$ or 1.5 $E_A$, which is at least 50% higher for the same average power input.

Figure 2:
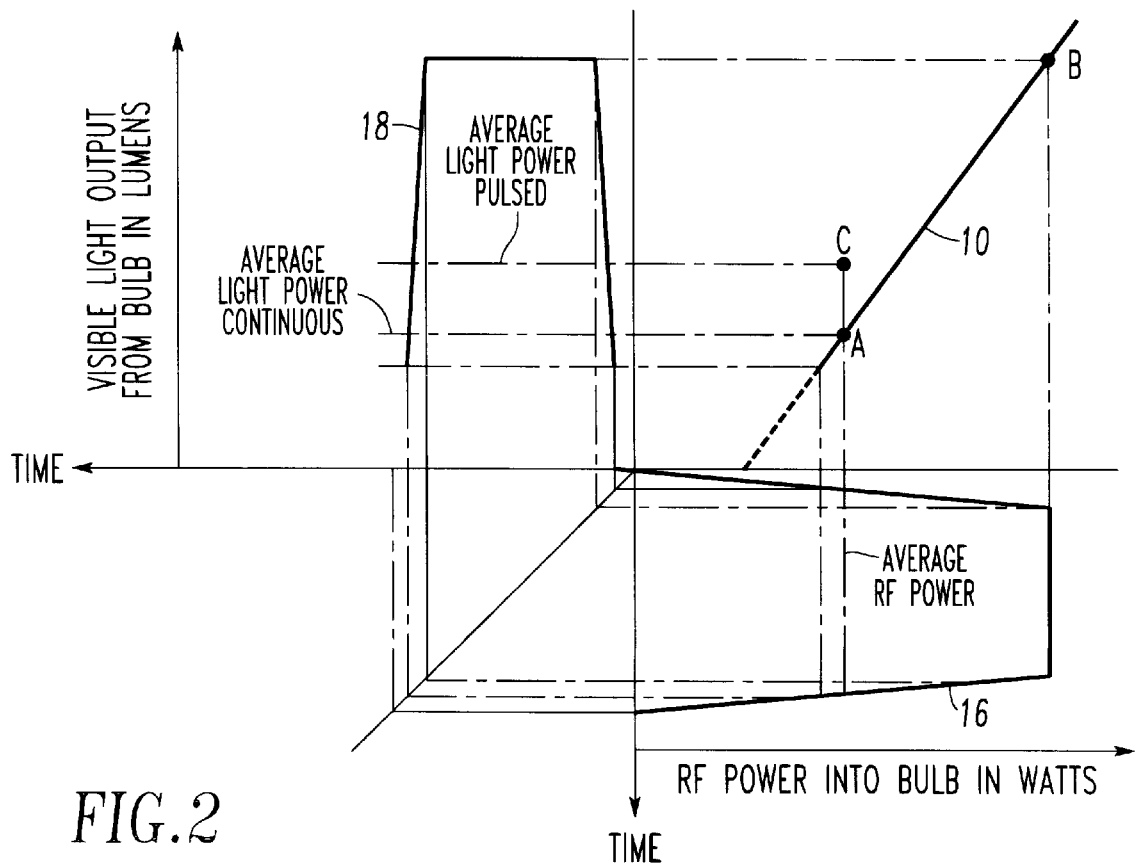
FIG. 2 is a graph illustrative of the light output emitted from an electrodeless light bulb when pulsed.

FIG. 2 illustrates an application of this concept to a preferred method of this invention where a trapezoidal power pulse 16 is applied as a function of time resulting in a visible light output characteristic such as shown by the trapezoidal waveform 18 and having an average light power output being produced at point C by being pulsed as opposed to average light power being emitted at point A. In order to generate light under such conditions, the pulse rate duration must be optimized to minimize flicker, while maximizing light production efficiency. It has been found that a pulse rate in a region of about 240 Hz or greater is desirable.

Figure 3:
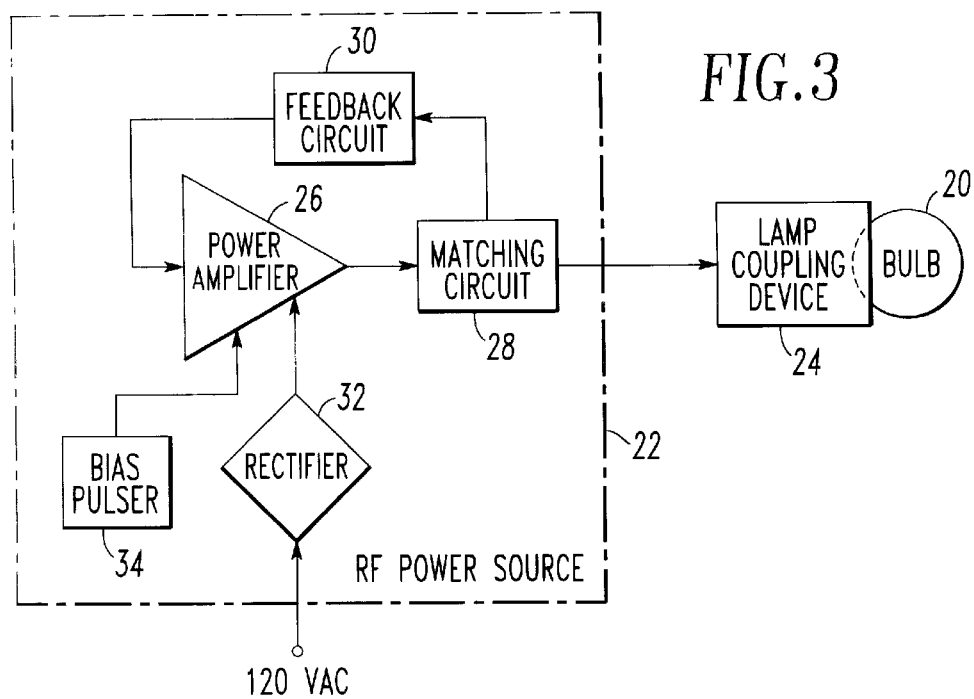
FIG. 3 is an electrical block diagram illustrative of the preferred embodiment of the invention.
Figure 4:
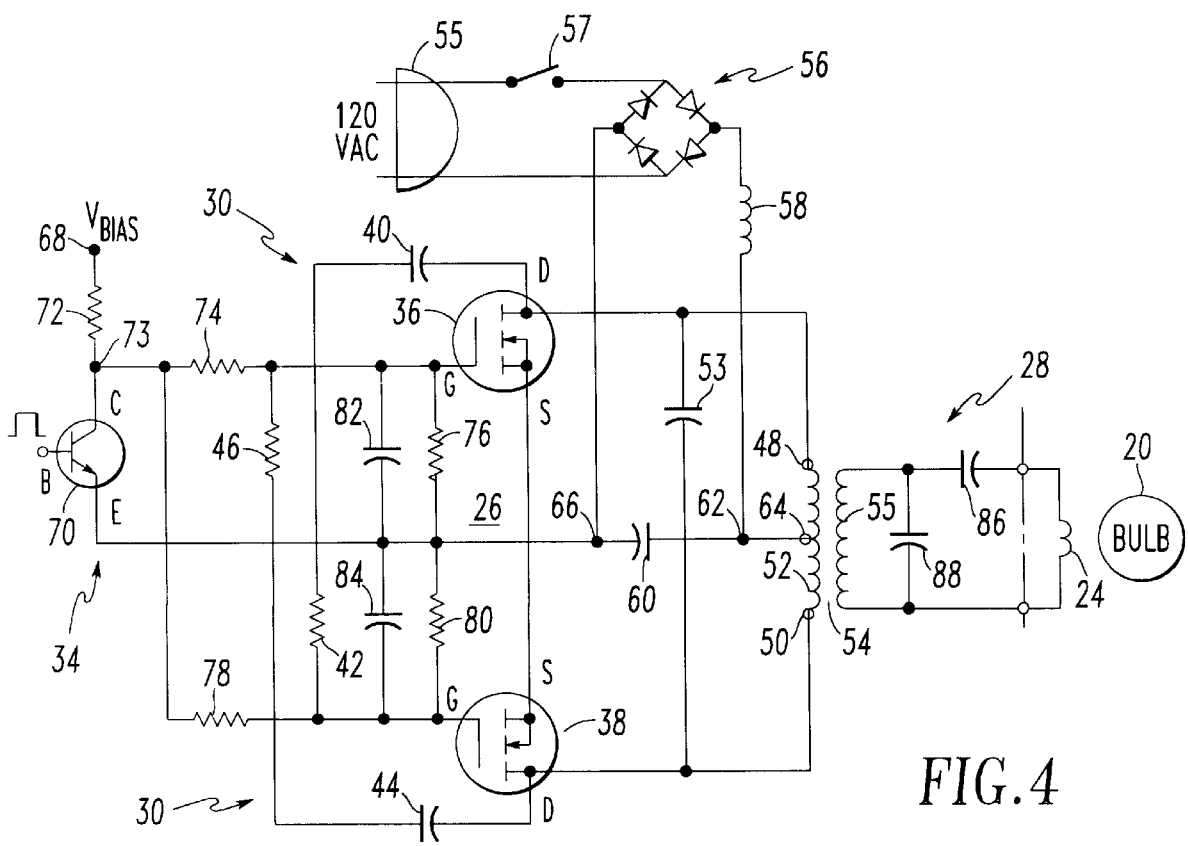
FIG. 4 is an electrical schematic diagram of the preferred embodiment of the invention shown in FIG. 3.

This now leads to a consideration of FIGS. 3 and 4 which are illustrative of the preferred embodiment of the invention.

As shown in FIG. 3, an electrodeless light bulb 20 of a known type, consisting of a transparent container filled with an inert gas and selected chemical element(s) emit an intense light when excited from an RF power source shown by reference numeral 22 via a lamp coupling device 24, which may include either an inductive or a capacitive coupling. In the present invention, the RF power source 22 includes a pulsed power oscillator made up of an RF power amplifier 26, an impedance matching circuit 28, and a feedback circuit 30, with the power amplifier 26 being powered from an AC/DC rectifier 32. Additionally, the power amplifier 26 is pulsed on and off as depicted in FIG. 2 by a pulsed bias source 34. This causes the power amplifier 26 to function as a pulsed oscillator.

Referring now to FIG. 4, the power amplifier 26 comprises a pair of MOSFETs 36 and 38 connected in push-pull circuit relationship. This includes having drain(D) and gate (G) electrodes cross coupled by means of resistor-capacitor coupling elements including capacitor 40, resistor 42, and capacitor 44, resistor 46. The respective drain(D) electrodes are further connected to opposite ends 48 and 50 of a center tapped primary winding 52 of an output transformer 54 also having a secondary winding 55. A capacitor 53 is also connected across the primary winding 52.

A drain supply voltage applied across the drain(D) and source(S) electrodes of the MOSFETs 36 and 38 is provided by a full wave AC/DC rectifier 56 coupled to a 120 VAC line voltage via a plug 55 and switch 57 and across which is connected an inductance-capacitance filter circuit including inductor 58 and capacitor 60. The intermediate connection between the inductor 58 and capacitor 60 at circuit node 62 is connected to the center tap 64 of the primary winding 52 of the output transformer 54 and thus supplies one side of the DC output from rectifier 56 to circuit node 62. The opposite or return side of the DC output from rectifier 56 is connected to commonly connected source(S) electrodes at circuit node 66.

Gate bias voltage $V_{bias}$ for the MOSFETs 36 and 38 is connected to terminal 68 from a source, not shown. It is coupled to the gate(G) electrodes of MOSFETs 36 and 38 by means of an NPN transistor 70 which acts as a pulsed gate, a collector(C) load resistor 72 and a pair of resistance type voltage dividers connected to the collector(C), and being respectively comprised of resistors 74, 76 and 78, 80. Resistors 76 and 80 terminate at a circuit node 66 which is common to the source(S) electrodes of MOSFETs 36 and 38 and which is also common to the emitter electrode(E) of the transistor 70. Capacitors 82 and 84 are also shown coupled in parallel with the resistors 76 and 80.

The circuit configuration shown in FIG. 4 comprises a quasi-switching amplifier (operated Class CD) which acts as an oscillator and which is pulsed through low level pulsing of the bias supply $V_{bias}$ coupled to the gate(G) electrodes of the MOSFETs 36 and 38 when pulses are applied to the base(B) electrode of the transistor 70. When desired, the circuit configuration shown in FIG. 4 may be pulsed by high level pulsing of the source-drain voltages fed thereto from the rectifier 56. When pulsed, an RF signal in the range of 10 MHz–100 MHz capable of exciting the bulb 20 is generated.

The load for the pulsed amplifier-oscillator is the impedance of the electrodeless light bulb 20 reflected back through the lamp coupling device 24 and impedance matching circuit 28. The coupling device 24 is shown in FIG. 4 comprised of an inductance coil while the matching circuit 28 is shown comprised of a series capacitor 86 connected to the exciter coil 24 and a parallel capacitor 88 coupled across the secondary winding 55 of the output transformer 54.

In such a configuration, the gate bias voltage for the MOSFETs 36 and 38, when pulsed, will cause a maximum acceptable or peak current to flow, for example, to point B of FIG. 2 thereby causing a maximum amplifier RF power output to be coupled to the bulb 20. Operation of the amplifier-oscillator shown in FIG. 4 is at a frequency which is entirely circuit dependent and is not dependent upon making the tuning of the output circuit conform with the frequency of a separate crystal oscillator. The load together with the matching circuit 28 comprise a resonant circuit whose frequency varies with the heating of the bulb 20. Inasmuch as this is a tuned circuit, use is made of its resonance characteristic to determine the oscillator frequency of operation in conjunction with the feedback path parameter provided by the cross-coupled paths 30 between the two sources and drains of MOSFETs 36 and 38.

Thus what has been shown and described is a pulsed power RF driver which improves the light emitting efficiency of an electrodeless light bulb over that attainable with continuous drive to the bulb. In addition, it utilizes a single frequency determining circuit, i.e. a tuned output, which eliminates the need for ensuring that an oscillator circuit with separate frequency source tracks the tuned circuit. It also provides a method for controlling light brightness without impacting significantly on color.

When a continuous RF input to the bulb is reduced to cause the light to dim, the color of its light output becomes increasingly blue as power is lowered. With the subject invention, however, power can be lowered by reducing the pulse duty cycle of the RF drive. This reduces average light output without significant color change until just before the light extinguishes.

Having thus shown and described what is at present considered to be the preferred method and embodiment of the subject invention, it should be noted that the same has been made by way of illustration and not limitation. Accordingly, all modifications, alterations and changes coming within the spirit and scope of the invention are herein meant to be included.

We claim:

1. An excitation circuit for an electrodeless lamp including a light bulb containing an inert gas and one or more predetermined chemical elements, comprising:
 an RF source providing an RF excitation signal for the light bulb and including an oscillator circuit comprising a push-pull RF amplifier circuit and a feedback circuit therefor, said feedback circuit including means for reflecting the loading effect of the light bulb through an impedance matching circuit for determining the operating frequency of the oscillator circuit as a function of bulb temperature;

reactance type coupling means located in relatively close proximity to said light bulb;

the impedance matching circuit located between said reactance type coupling means and said oscillator circuit; and means for periodically pulsing said oscillator circuit on and off within a predetermined time period so as to drive the light bulb to a peak power operating point where light generation efficiency is relatively high while maintaining a relatively low average power input;

wherein said push-pull RF power amplifier circuit includes a pair of cross coupled MOSFETs having gate, source and drain electrodes, and wherein said drain electrodes are coupled to said impedance matching circuit, said source electrodes are commonly connected together, said drain and gate electrodes of said MOSFETs are cross coupled by a pair of series connected resistance-capacitance coupling elements, and said gate electrodes are coupled to said means for pulsing, whereby a pulsed gate bias voltage is applied thereto for enabling the oscillator circuit to generate a pulsed RF excitation signal for said light bulb.

2. An excitation circuit according to claim 1 wherein said reactance type coupling means comprises an inductance coil.

3. An excitation circuit according to claim 1 and additionally including an output transformer coupling said drain electrodes to said impedance matching circuit.

4. An excitation circuit according to claim 3 wherein said output transformer includes a primary winding having a center tap and a secondary winding, and wherein said primary winding is connected across said drain electrodes, said center tap is capacitively coupled to said source electrodes, and said secondary winding is coupled to said impedance matching circuit.

5. An excitation circuit according to claim 1 and wherein said means for pulsing includes a pulsed gate circuit coupled between a steady state bias voltage coupled to a bias voltage terminal and said gate electrodes.

6. An excitation circuit according to claim 5 wherein said pulsed gate circuit includes a semiconductor gate device having a control electrode and a pair of current conducting electrodes, and wherein a control pulse for pulsing said oscillator is coupled to said control electrode, one of said pair of current conducting electrodes is directly connected to said source electrodes, and the other of said pair of current conducting electrodes is resistively coupled to said bias voltage terminal and said gate electrodes of said MOSFETS.

7. An excitation circuit according to claim 6 wherein said semiconductor gate device comprises a transistor.

8. A method of exciting an electrodeless light bulb containing an inert gas and certain chemical elements comprising the steps of:

periodically pulsing an RF oscillator circuit on and off at a predetermined rate and duty cycle for exciting and driving the light bulb to a peak power operating point where light generation efficiency is relatively high while maintaining a relatively low average power input and wherein the rate comprises a rate of about 240 Hz or more wherein flicker of the light emitted by said bulb is substantially imperceptible to the human eye; and coupling a pulse of RF energy to said electrodeless light bulb.

* * * * *